(12) United States Patent
Goto

(10) Patent No.: US 11,955,605 B2
(45) Date of Patent: Apr. 9, 2024

(54) METHOD OF MANUFACTURING ALL-SOLID-STATE BATTERY

(71) Applicant: TOYOTA JIDOSHA KABUSHIKI KAISHA, Toyota Aichi-ken (JP)

(72) Inventor: Ippei Goto, Okazaki Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 302 days.

(21) Appl. No.: 17/573,862

(22) Filed: Jan. 12, 2022

(65) Prior Publication Data

US 2022/0278373 A1 Sep. 1, 2022

(30) Foreign Application Priority Data

Feb. 26, 2021 (JP) .................................. 2021-030005

(51) Int. Cl.
*H01M 10/0585* (2010.01)
*H01M 10/04* (2006.01)

(52) U.S. Cl.
CPC ... *H01M 10/0585* (2013.01); *H01M 10/0468* (2013.01); *H01M 2300/0094* (2013.01)

(58) Field of Classification Search
CPC .......... H01M 10/0468; H01M 10/052; H01M 10/0562; H01M 10/0585; H01M 2300/0094; Y02E 60/10; Y02P 70/50
USPC ... 156/60, 89.11, 89.12, 89.13, 89.16, 89.25, 156/89.28; 429/188, 189, 304
See application file for complete search history.

(56) References Cited

FOREIGN PATENT DOCUMENTS

| JP | 2009-301959 A | 12/2009 |
| JP | 2017-054720 A | 3/2017 |
| JP | 2020-107594 A | 7/2020 |

*Primary Examiner* — Philip C Tucker
*Assistant Examiner* — Brian R Slawski
(74) *Attorney, Agent, or Firm* — Dinsmore & Shohl LLP

(57) ABSTRACT

To improve durability of an all-solid-state battery, a method of manufacturing an all-solid-state battery includes: obtaining a stack having an anode active material layer, a cathode active material layer, a first solid electrolyte layer, and a second solid electrolyte layer, the first solid electrolyte layer and the second solid electrolyte layer being disposed between the anode active material layer and the cathode active material layer, the second solid electrolyte layer containing a sublimational filler; densifying the stack; and subliming the sublimational filler from the second solid electrolyte layer.

1 Claim, 2 Drawing Sheets

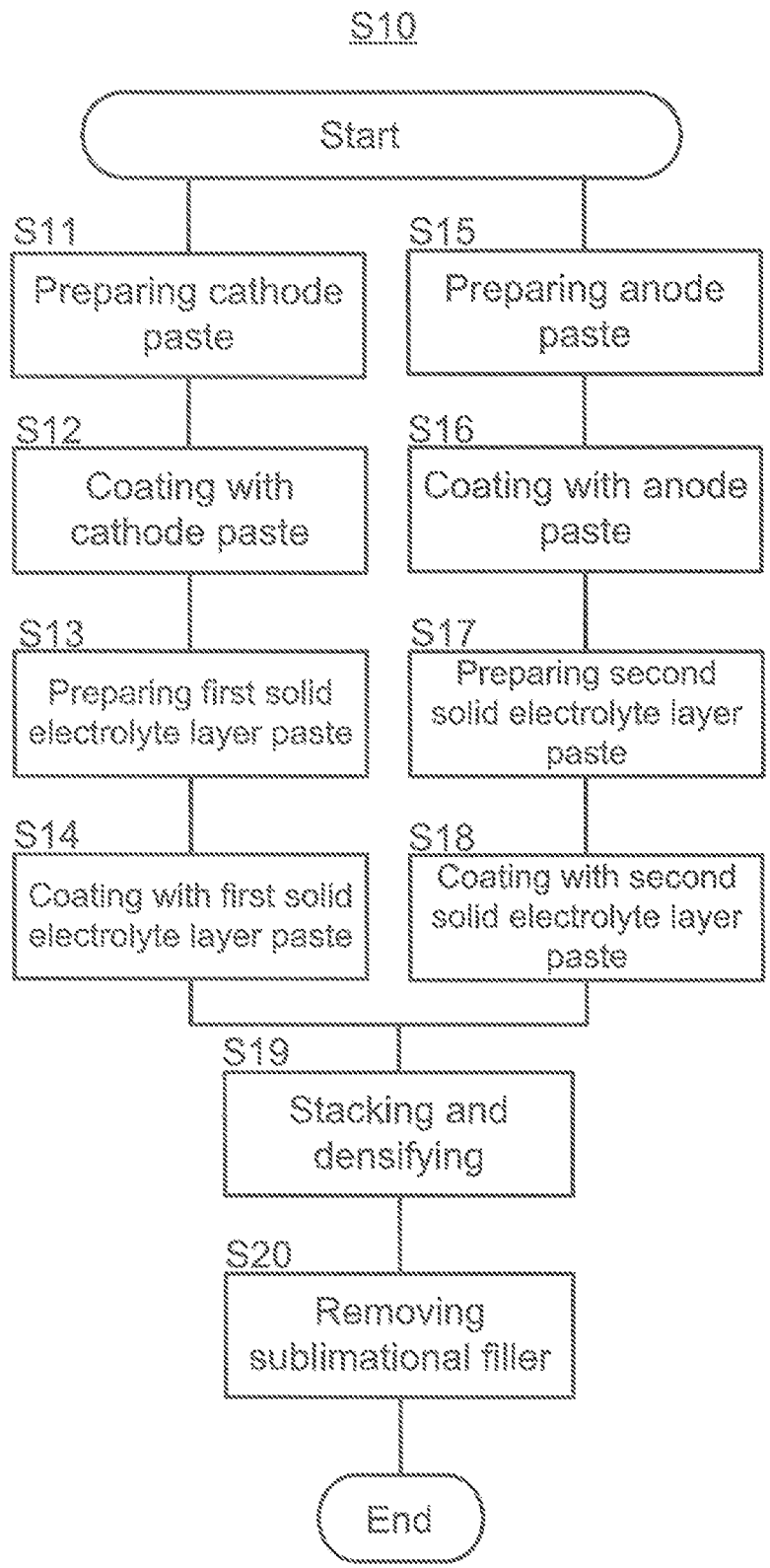

US 11,955,605 B2

METHOD OF MANUFACTURING ALL-SOLID-STATE BATTERY

CROSS-REFERENCE TO RELATED APPLICATIONS

This application is based upon and claims the benefit of priority of the prior Japanese Patent Applications No. 2021-030005 filed Feb. 26, 2021, the entire contents of which are incorporated herein by reference.

FIELD

The present disclosure relates to an all-solid-state battery.

BACKGROUND

An all-solid-state battery is provided with a cathode including a cathode active material layer, an anode including an anode active material layer, and a solid electrolyte layer that is disposed between them and that contains a solid electrolyte.

For example, Patent Literature 1 discloses an anode and an anode active material for all-solid-state batteries. These anode and anode active material are suitable to realize high energy density and capacity retention.

Patent Literature 2 discloses a solid electrolyte sheet that is formed by stacking a solid electrolyte layer having a voidage of at most 10%, and an easily breakable layer (anode side) having a voidage of at least 15%. The easily breakable layer is manufactured as a press pressure is adjusted.

Patent Literature 3 discloses that a solid electrolyte layer of an all-solid-state battery includes a powder molding part formed by molding a powder of a first solid electrolyte, and a surface vapor deposition film formed by depositing a second solid electrolyte on at least one surface of the solid electrolyte layer on the cathode side or the anode side by a gas phase method. According to Patent Literature 3, the surface vapor deposited film included as described above can suppress dendrite growth of metallic lithium, which can prevent an internal short circuit of the battery.

CITATION LIST

Patent Literature

Patent Literature 1: JP 2017-054720 A
Patent Literature 2: JP 2020-107594 A
Patent Literature 3: JP 2009-301959 A

SUMMARY

Technical Problem

The foregoing prior arts disclose the all-solid-state battery using an alloy-based active material. Such an all-solid-state battery has a problem with durability: for example, the solid electrolyte cracks to short-circuit; and the solid electrolyte is densified, so that voids provided therein are crushed.

An object of the present disclosure is to provide a method of manufacturing an all-solid-state battery capable of improving durability thereof.

Solution to Problem

One aspect of the present disclosure is a method of manufacturing an all-solid-state battery, the method comprising: obtaining a stack having an anode active material layer, a cathode active material layer, a first solid electrolyte layer, and a second solid electrolyte layer, the first solid electrolyte layer and the second solid electrolyte layer being disposed between the anode active material layer and the cathode active material layer, the second solid electrolyte layer containing a sublimational filler; densifying the stack; and subliming the sublimational filler from the second solid electrolyte layer, to solve the above problem.

Effects

The method of manufacturing an all-solid-state battery according to the present disclosure is capable of improving durability of the obtained all-solid-state battery.

BRIEF DESCRIPTION OF DRAWINGS

FIG. 2 explanatorily shows a flow of a method S10 of manufacturing an all-solid-state battery.

DESCRIPTION OF EMBODIMENTS

1. All-Solid-State Battery

Figure 1:
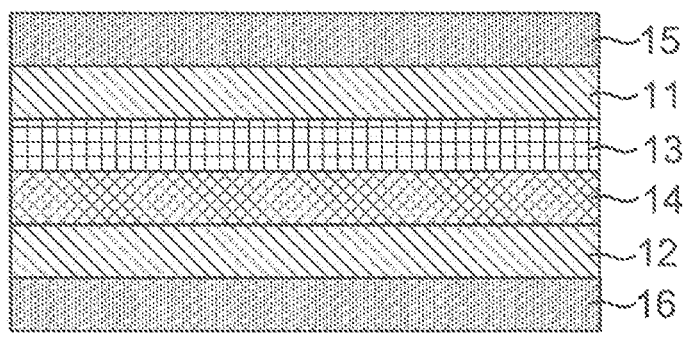
FIG. 1 explanatorily shows a layer structure of an all-solid-state battery 10.

First, an all-solid-state battery manufactured according to a manufacturing method of the present disclosure will be described.

FIG. 1 shows a schematic cross-sectional view of one example of an all-solid-state battery. As shown in FIG. 1, an all-solid-state battery 10 has a cathode active material layer 11 containing a cathode active material, an anode active material layer 12 containing an anode active material, a first solid electrolyte layer 13 and a second solid electrolyte layer 14 which are formed between the cathode active material layer 11 and the anode active material layer 12, a cathode current collector layer 15 configured to collect current of the cathode active material layer 11, and an anode current collector layer 16 configured to collect current of the anode active material layer 12. The cathode active material layer 11 and the cathode current collector layer 15 may be called together a cathode. The anode active material layer 12 and the anode current collector layer 16 may be called together an anode.

Hereinafter each component of the all-solid-state battery 10 will be described.

1.1. Cathode Active Material Layer

The cathode active material layer 11 is a layer containing a cathode active material, and may further contain at least one of a solid electrolyte material, a conductive material and a binder if necessary.

Any known active material may be used as the cathode active material. Examples of the cathode active material include cobalt-based (such as $LiCoO_2$), nickel-based (such as $LiNiO_2$), manganese-based (such as $LiMn_2O_4$ and $Li_2Mn_2O_3$), iron phosphate-based (such as $LiFePO_4$ and $Li_2FeP_2O_7$), NCA-based (such as a compound of nickel, cobalt and aluminum), and NMC-based (such as a compound of nickel, manganese and cobalt) active materials, more specifically, $LiNi_{1/3}Co_{1/3}Mn_{1/3}O_2$.

The surface of the cathode active material may be coated with an oxide layer such as a lithium niobate layer, a lithium titanate layer and a lithium phosphate layer.

In some embodiments, the solid electrolyte is an inorganic solid electrolyte because the inorganic solid electrolyte has high ionic conductivity and is excellent in heat resistance, compared with the organic polymer electrolyte. Examples of the inorganic solid electrolyte include sulfide solid electrolytes and oxide solid electrolytes.

Examples of sulfide solid electrolyte materials having Li-ion conductivity include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—ZmSn (m and n are positive numbers, and Z is any of Ge, Zn and Ga), $Li_2S$—$GeS_2$, $Li_2S$—$SiS_2$—$Li_3PO_4$, and $Li_2S$—$SiS_2$—LixMOy (x and y are positive numbers, and M is any of P, Si, Ge, B, Al, Ga and In). The expression "$Li_2S$—$P_2S_5$" means any sulfide solid electrolyte materials made using a raw material composition containing $Li_2S$ and $P_2S_5$. The same is applied to the other expressions.

Examples of oxide solid electrolyte materials having Li-ion conductivity include compounds having a NASICON-like structure. Examples of compounds having a NASICON-like structure include compounds (LAGP) represented by the general formula $Li_{1+x}Al_xGe_{2-x}(PO_4)_3$ (0≤x≤2), and compounds (LATP) represented by the general formula $Li_{1+x}Al_xTi_{2-x}(PO_4)_3$ (0≤x≤2). Examples of other oxide solid electrolyte materials include LiLaTiO (such as $Li_{0.34}La_{0.51}TiO_3$), LiPON (such as $Li_{2.9}PO_{3.3}N_{0.46}$) and LiLaZrO (such as $Li_7La_3Zr_2O_{12}$).

The binder is not particularly limited as long as being chemically and electrically stable. Examples of the binder include fluorine-based binders such as polyvinylidene fluoride (PVDF) and polytetrafluoroethylene (PTFE), rubber-based binders such as styrene-butadiene rubber (SBR), olefinic binders such as polypropylene (PP) and polyethylene (PE), and cellulose-based binders such as carboxymethyl cellulose (CMC).

As the conductive material, a carbon material such as acetylene black and Ketjenblack, or a metallic material such as nickel, aluminum and stainless steel may be used.

The content of each constituent in the cathode active material layer 11, and the shape of the cathode active material layer 11 may be the same as of conventional ones. In some embodiments, the cathode active material layer 11 is in the form of a sheet from a viewpoint that the all-solid-state battery 10 can be easily formed. In some embodiments, in this case, the thickness of the cathode active material layer 11 is, for example, 0.1 μm to 1 mm or 1 μm to 150 μm.

1.2. Anode Active Material Layer

The anode active material layer 12 is a layer containing at least an anode active material, and may contain at least one of a solid electrolyte material, a conductive material and a binder if necessary. The solid electrolyte material, the conductive material and the binder may be considered in the same manner as for the cathode active material layer 11.

There is no particular limitation on the anode active material. When a lithium ion battery is formed, examples of the anode active material include carbon materials such as graphite and hard carbon, various oxides such as lithium titanate, Si and Si alloys, and metallic lithium and lithium alloys.

1.3. First Solid Electrolyte Layer

In this embodiment, the first solid electrolyte layer 13 is a solid electrolyte layer disposed on the cathode active material layer 11 side between the cathode active material layer 11 and the anode active material layer 12. The first solid electrolyte layer 13 contains at least a solid electrolyte material. The solid electrolyte material may be considered in the same manner as the solid electrolyte material described for the cathode active material layer 11.

1.4. Second Solid Electrolyte Layer

In this embodiment, the second solid electrolyte layer 14 is a solid electrolyte layer disposed on the anode active material layer 12 side between the cathode active material layer 11 and the anode active material layer 12. In other words, in this embodiment, the second solid electrolyte layer 14 is disposed between the first solid electrolyte 13 and the anode active material layer 12.

The second solid electrolyte layer 14 contains at least a solid electrolyte material. The solid electrolyte material may be considered in the same manner as the solid electrolyte material described for the cathode active material layer 11.

Here, the second solid electrolyte layer 14 has a high voidage compared with the first solid electrolyte layer 13. This can increase the durability (suppress a self-discharge voltage after the cycle) because a higher voidage of the second solid electrolyte layer 14 than the first solid electrolyte layer 13 causes voids in the second solid electrolyte layer 14 to weaken stress due to a volumetric change of the anode in charge and discharge, so that it is prevented that the first solid electrolyte layer cracks to short-circuit. In addition, even if the second solid electrolyte layer 14 is cracked, it can be suppressed that the crack reaches the cathode active material layer to cause a short-circuit.

The second solid electrolyte layer 14 having a high voidage compared with the first solid electrolyte layer 13 brings about the foregoing effect. This effect is more remarkable when the ratio (b/a) of the voidage b of the second solid electrolyte 14 to the voidage a of the first solid electrolyte layer 13 is at least 2.

There is no particular limitation on the difference in thickness between the second solid electrolyte layer 14 and the first solid electrolyte layer 13. The foregoing effect can be further remarkable when the ratio (d/c) of the thickness d of the second solid electrolyte 14 to the thickness c of the first solid electrolyte layer 13 is in the range of 0.25 and 4.

1.5. Current Collector Layers

The current collectors are the cathode current collector layer 15 configured to collect current of the cathode active material layer 11, and the anode current collector layer 16 configured to collect current of the anode active material layer 12. Examples of the material constituting the cathode current collector layer 15 include stainless steel, aluminum, nickel, iron, titanium and carbon. Examples of the material constituting the anode current collector layer 16 include stainless steel, copper, nickel and carbon.

1.6. Battery Case

The all-solid-state battery may be provided with a battery case that is not shown. The battery case is a case to house each member. An example of the battery case is a stainless battery case.

2. Method of Manufacturing All-Solid-State Battery

The method of manufacturing an all-solid-state battery will be hereinafter described. FIG. 2 shows a flow of a method S10 of manufacturing an all-solid-state battery according to one embodiment (may be referred to as "manufacturing method S10"). As can be seen from FIG. 2, the manufacturing method S10 includes a step of preparing a member on the cathode side (S11 of preparing a cathode paste, S12 of coating with the cathode paste, S13 of preparing a first solid electrolyte layer paste, and S14 of coating with the first solid electrolyte layer paste), a step of preparing a member on the anode side (S15 of preparing an anode paste, S16 of coating with the anode paste, S17 of preparing a second solid electrolyte layer paste, and S18 of coating with the second solid electrolyte layer paste), a step S19 of stacking and densifying, and a step S20 of removing a sublimational filler.

Hereinafter each step will be described. Here, for clarity, each layer is denoted by the same reference signs as in the all-solid-state battery 10. However, the manufacturing method S10 may be also applied in manufacture of all-solid-state batteries other than the all-solid-state battery 10.

2.1. Step of Preparing Member on Cathode Side

In the step of preparing a member on the cathode side in this embodiment, a layer to be the cathode current collector layer 15 is coated with a layer to be the cathode active material layer 11, and a layer to be the first solid electrolyte layer 13 in this order. More specifically, the step of preparing a member on the cathode side includes each step of S11 of preparing a cathode paste, S12 of coating with the cathode paste, S13 of preparing a first solid electrolyte layer paste, and S14 of coating with the first solid electrolyte layer paste.

Specifically, a cathode active material is prepared. Necessary materials (such as a solid electrolyte, a binder and a conductive material) are mixed to this cathode active material, and then the resultant cathode paste is obtained (S11 of preparing a cathode paste). Next, the layer to be the cathode current collector layer 15 is coated with the cathode paste obtained in S11 of preparing a cathode paste, so that the cathode paste has a predetermined thickness, and the cathode paste is dried to be the layer to be the cathode active material layer 11 (S12 of coating with the cathode paste).

A first solid electrolyte material (such as a sulfide solid electrolyte material) is prepared. Necessary materials (such as a binder) are blended and mixed to this first solid electrolyte material, and then the resultant first solid electrolyte layer paste is obtained (S13 of preparing a first solid electrolyte layer paste). Thereafter, the first solid electrolyte paste obtained in S13 of preparing a first solid electrolyte layer paste is applied to the layer to be the cathode active material layer 11, which is formed in S12 of coating with the cathode paste, so as to have a predetermined thickness, and is dried, and then the resultant layer to be the first solid electrolyte layer 13 is obtained (S14 of coating with the first solid electrolyte layer paste).

Through the foregoing, the member on the cathode side (stack) formed by stacking the layer to be the cathode active material layer 11, and the layer to be the first solid electrolyte layer 13 on the layer to be the cathode current collector layer 15 is obtained.

2.2. Step of Preparing Member on Anode Side

The step of preparing a member on the anode side in this embodiment is a step parallel to the step of preparing a member on the cathode side. In the step of preparing a member on the anode side, a layer to be the anode current collector layer 16 is coated with a layer to be the anode active material layer 12, and a layer to be the second solid electrolyte layer 14 in this order. More specifically, the step of preparing a member on the anode side includes each step of S15 of preparing an anode paste, S16 of coating with the anode paste, S17 of preparing a second solid electrolyte layer paste, and S18 of coating with the second solid electrolyte layer paste.

Specifically, an anode active material is prepared. Necessary materials (such as a solid electrolyte, a binder and a conductive material) are mixed to this anode active material, and then the resultant anode paste is obtained (S15 of preparing an anode paste). Next, the layer to be the anode current collector layer 16 is coated with the anode paste obtained in S15 of preparing an anode paste, so that the anode paste has a predetermined thickness, and the anode paste is dried to be the layer to be the anode active material layer 12 (S16 of coating with the anode paste).

A second solid electrolyte material (such as a sulfide solid electrolyte) is prepared. Necessary materials are blended and mixed to this second solid electrolyte material, and then the resultant second solid electrolyte layer paste is obtained (S17 of preparing a second solid electrolyte layer paste).

Here, as described above, the second solid electrolyte layer 14 is formed so as to have a higher voidage than the first solid electrolyte layer 13. Therefore, in S17 of preparing a second solid electrolyte layer paste, the necessary materials include a sublimational filler in order to form voids for this voidage.

The sublimational filler is a sublimable material, is in a solid state in S17 of preparing a second solid electrolyte layer paste, and is a vaporizable (sublimable) material in S20 of removing a sublimational filler described later. Such a material is not particularly limited, but an example thereof is sulfur.

The content of the sublimational filler in the second solid electrolyte layer paste is determined so as to satisfy the voidage that the second solid electrolyte layer 14 is to have.

Thereafter, the second solid electrolyte paste obtained in S17 of preparing a second solid electrolyte layer paste is applied to the layer to be the anode active material layer 12, which is formed in S16 of coating with the anode paste, so as to have a predetermined thickness, and is dried, and then the resultant layer to be the second solid electrolyte layer 14 is obtained (S18 of coating with the second solid electrolyte layer paste).

Through the foregoing, the member on the anode side (stack) formed by stacking the layer to be the anode active material layer 12, and the layer to be the second solid electrolyte layer 14 on the layer to be the anode current collector layer 16 is obtained.

2.3. Stacking and Densifying

In the step S19 of stacking and densifying, the layer to be the first solid electrolyte layer 13 in the member on the cathode side, and the layer to be the second solid electrolyte layer 14 in the member on the anode side, which are prepared so far, are laminated and pressed to densify, to be an electrode stack.

2.4. Removing Sublimational Filler

In the step S20 of removing a sublimational filler, the electrode stack obtained in S19 of stacking and densifying is put in an outer casing, and the sublimational filler contained in the layer to be the second solid electrolyte layer 14 is removed. A suitable method may be selected for a way of removing the sublimational filler. Examples of such a method include vacuum (heating) drying.

2.5. Effect etc.

According to the manufacturing method of the present disclosure, pressing is carried out before voids are formed in a state where the sublimational filler is contained. Thus, it is suppressed that a restraining force is absorbed by voids in the pressing, so that the restraining force is efficiently transmitted to each layer, and each layer is firmly joined even if the restraining pressure is low, which enables charge and discharge, and leads to excellent cyclability.

In addition, the sublimational filler is removed to form voids after the pressing, so that the voids are not crushed but remain in the second solid electrolyte layer. Thus, change in electrodes due to expansion and shrinkage thereof according to charge and discharge as described above when the all-solid-state battery is used can be efficiently absorbed.

3. Others

The example where the solid electrolyte layer includes two first and second solid electrolyte layers has been described above. Three or more solid electrolyte layers may be provided as long at least one of them is prepared to contain the sublimational filler and is formed to have a higher voidage than those of the other respective solid electrolyte layers.

The example where the solid electrolyte layer on the anode side has a higher voidage than the solid electrolyte layer on the cathode side has been described above, which may be vice versa. However, in some embodiments, the second solid electrolyte layer is disposed on the anode side as in this embodiment since change in the anode due to expansion and shrinkage in charge and discharge is larger.

In the above description, all the layers are each stacked, and thereafter pressed (densified). The stack on the cathode side, which includes the first solid electrolyte layer, and the stack on the anode side, which includes the second solid electrolyte layer, may be separately pressed (densified) and then joined.

4. Test Examples 4.1. Preparing All-Solid-State Batteries for Tests 1 to 11

[Test 1]

Test 1 was for a method of manufacturing an all-solid-state battery including mixing a sublimational filler with a second solid electrolyte layer (solid electrolyte layer on the anode side), and subliming the sublimational filler after stacking and densifying (pressing) to form voids in the second solid electrolyte layer. Here, this is referred to as a manufacturing method A, and will be described in detail below.

<Preparing Coated Cathode Active Material>

As a cathode active material, a $LiNi_{1/3}Mn_{1/3}Co_{1/3}O_2$ powder having a mean particle diameter (D50) measured based on the laser diffraction and scattering method of 6 μm was used. The surface of this cathode active material was coated with $LiNbO_3$, using the sol-gel process. Specifically, $LiOC_2H_5$ and $Nb(OC_2H_5)_5$ of the same number of moles were dissolved in an ethanol solvent, and then the resultant metal alkoxide liquid for coating was prepared. Then, the surface of the cathode active material was coated with the metal alkoxide liquid for coating under an atmospheric pressure, using a tumbling fluidized coating machine (model: SFP-01, a product manufactured by Powrex Corporation). At this time, the processing time was adjusted, so that the thickness of the coating was approximately 5 nm. Next, the coated cathode active material was subjected to heat treatment at 350° C. for 1 hour under an atmospheric pressure, and then the resultant cathode active material, which was made from $LiNi_{1/3}Mn_{1/3}Co_{1/3}O_2$, and the surface of which is coated with $LiNbO_3$, was obtained.

<Preparing Layer to be Cathode>

A layer to be a cathode was prepared, using the obtained cathode active material, and a glass ceramic of $15LiBr·10LiI·75(0.75Li_2S·0.25P_2S_5)$ having a mean particle diameter (D50) measured based on the laser diffraction and scattering method of 2.5 μm, as a sulfide solid electrolyte.

Specifically, the cathode active material and the sulfide solid electrolyte were weighed, so that the weight ratio thereof was 75:25. Further, 4 parts by weight of a PVDF-based binder, and 6 parts by weight of a conductive material (acetylene black) were weighed to 100 parts by weight of the cathode active material. They were blended in butyl butyrate, so as to have a solid content of 70 weight %, and kneaded with a stirrer. Thereby, the resultant composition for forming a cathode active material layer (cathode paste) was obtained.

Next, the obtained cathode paste was uniformly applied onto a layer to be a cathode current collector made of aluminum foil having a thickness of 15 μm by blade coating using a commercially available applicator, so that the weight of the paste was 26 mg/cm². Thereafter the coating was dried at 120° C. for 3 minutes, and then the resultant layer to be a cathode such that a layer to be a cathode active material layer was formed on the layer to be a cathode current collector, which was made of aluminum foil, was obtained.

<Preparing Layer to be Anode>

A layer to be an anode was prepared, using a Si (silicon) powder having a mean particle diameter (D50) measured based on the laser diffraction and scattering method of 6 μm, as an anode active material, and the sulfide solid electrolyte same as for the layer to be a cathode, as a solid electrolyte. Specifically, the anode active material and the sulfide solid electrolyte were weighed, so that the weight ratio thereof was 55:45. Further, 6 parts by weight of a PVDF-based binder, and 6 parts by weight of a conductive material (acetylene black) were weighed to 100 parts by weight of the anode active material. They were blended in butyl butyrate, so as to have a solid content of 70 weight %, and kneaded with a stirrer. Thereby, the resultant composition for forming an anode active material layer (anode paste) was obtained.

Next, the obtained anode paste was uniformly applied to a layer to be an anode current collector layer made of copper foil having a thickness of 15 μm by blade coating using a commercially available applicator, so that the weight of the paste was 4.0 mg/cm². Thereafter the coating was dried at 120° C. for approximately 3 minutes, and then the resultant layer to be an anode such that a layer to be an anode active material layer was formed on the layer to be an anode current collector, which was made of copper foil, was obtained.

<Preparing Layer to be First Solid Electrolyte Layer>

A layer to be a first solid electrolyte layer was prepared on the layer to be a cathode, using the sulfide solid electrolyte used for preparing the layer to be a cathode and the layer to be an anode.

First, the layer to be a cathode active material layer was covered with stainless (SUS) foil, and pressure is applied (25° C., 15 MPa, 30 seconds) to the resultant by a pressing machine.

Next, 99.0 parts by weight of the sulfide solid electrolyte, and 1.0 part by weight of a SBR (styrene-butadiene rubber)-based binder were weighed, and blended in butyl butyrate so as to have a solid content of 60 weight %. The resultant was subjected to ultrasonic dispersing by an ultrasonic dispersive device (model: UH-50, a product manufactured by SMT Corporation) for approximately 2 minutes. Thereby, the resultant composition for forming a first solid electrolyte layer (first solid electrolyte paste) was obtained.

Thereafter the obtained first solid electrolyte paste was uniformly applied onto the layer to be a cathode active material layer in the same manner as when the layer to be a cathode was prepared as described above, so that the weight of the paste was 8.0 mg/cm² (thickness: 40 μm). Thereafter the resultant was air-dried, and further dried at 120° C. for approximately 3 minutes. Then, the layer to be a first solid electrolyte layer was stacked on the layer to be a cathode active material layer.

<Preparing Layer to be Second Solid Electrolyte Layer>

A layer to be a second solid electrolyte layer was prepared on the layer to be an anode, using the sulfide solid electrolyte used for preparing the layer to be a cathode and the layer to be an anode.

First, the layer to be an anode active material layer was covered with stainless (SUS) foil, and pressure is applied (25° C., 15 MPa, 30 seconds) to the resultant by a pressing machine.

Next, 88.6 parts by weight of the sulfide solid electrolyte, 1.0 part by weight of a SBR (styrene-butadiene rubber)-based binder, and 10.4 parts by weight of sulfur as a sublimational filler were weighed, and blended in butyl butyrate so as to have a solid content of 60 weight %. The resultant was subjected to ultrasonic dispersing by an ultrasonic dispersive device (model: UH-50, a product manufactured by SMT Corporation) for approximately 2 minutes. Thereby, the resultant composition for forming a second solid electrolyte layer (second solid electrolyte paste) was obtained.

Thereafter the obtained second solid electrolyte paste was uniformly applied to the layer to be an anode active material layer in the same manner as when the layer to be a cathode was prepared as described above, so that the weight of the paste was 2.0 mg/cm$^2$ (thickness: 10 μm). Thereafter the resultant was air-dried, and further dried at 120° C. for approximately 3 minutes. Then, the layer to be a second solid electrolyte layer was stacked on the layer to be an anode active material layer.

<Preparing All-Solid-State Battery (Battery Assembly), and Forming Voids>

A 3 cm square was stamped out from each of the layer to be a cathode, and the layer to be a first solid electrolyte layer together with the aluminum foil, and was laminated to the layer to be an anode, and the layer to be a second solid electrolyte layer, each having the same shape of the stamped square, and pressed at 25° C. at a press pressure of 300 MPa for 1 minute. Then, the resultant electrode stack was obtained.

The electrode stack obtained as described above was put into an outer casing which is made of an aluminum laminated film and to which cathode and anode terminals were annexed in advance, and after sulfur was removed from the second solid electrolyte layer, which was on the anode side, via a step of vacuum drying at 140° C. for 12 hours, was sealed up. Then, the resultant all-solid-state battery (all-solid-state lithium ion secondary battery) for Test 1, having voids in the solid electrolyte layer after the electrode bodies were joined and densified was obtained.

[Test 2]

An all-solid-state battery (all-solid-state lithium ion secondary battery) for Test 2 was obtained using the same materials through the same steps as for Test 1 except that the compounding ratio when the second solid electrolyte paste was prepared was: the sulfide solid electrolyte was 78 parts by weight; the SBR (styrene-butadiene rubber)-based binder was 1.0 part by weight; and sulfur was 21 parts by weight.

[Test 3]

An all-solid-state battery (all-solid-state lithium ion secondary battery) for Test 3 was obtained using the same materials through the same steps as for Test 1 except that the compounding ratio when the second solid electrolyte paste was prepared was: the sulfide solid electrolyte was 67.2 parts by weight; the SBR (styrene-butadiene rubber)-based binder was 1.0 part by weight; and sulfur was 31.8 parts by weight.

[Test 4] An all-solid-state battery (all-solid-state lithium ion secondary battery) for Test 4 was obtained using the same materials through the same steps as for Test 1 except that the compounding ratio when the second solid electrolyte paste was prepared was: the sulfide solid electrolyte was 56.2 parts by weight; the SBR (styrene-butadiene rubber)-based binder was 1.0 part by weight; and sulfur was 42.8 parts by weight.

[Test 5]

An all-solid-state battery (all-solid-state lithium ion secondary battery) for Test 5 was obtained using the same materials through the same steps as for Test 2 except that the pastes were uniformly applied, so that the weight of the first solid electrolyte layer was 5.0 mg/cm$^2$ (thickness: 25 μm) and the weight of the second solid electrolyte layer was 5.0 mg/cm$^2$ (thickness: 25 μm).

[Test 6]

An all-solid-state battery (all-solid-state lithium ion secondary battery) for Test 6 was obtained using the same materials through the same steps as for Test 2 except that the pastes were uniformly applied, so that the weight of the first solid electrolyte layer was 2.0 mg/cm$^2$ (thickness: 10 μm) and the weight of the second solid electrolyte layer was 8.0 mg/cm$^2$ (thickness: 40 μm).

[Test 7]

An all-solid-state battery (all-solid-state lithium ion secondary battery) for Test 7 was obtained using the same materials through the same steps as for Test 1 except that the compounding ratio when the second solid electrolyte paste was prepared was: the sulfide solid electrolyte was 93.9 parts by weight; the SBR (styrene-butadiene rubber)-based binder was 1.0 part by weight; and sulfur as the sublimational filler was 5.1 parts by weight.

[Test 8]

An all-solid-state battery (all-solid-state lithium ion secondary battery) for Test 8 was obtained using the same materials through the same steps as for Test 2 except that the pastes were uniformly applied, so that the weight of the first solid electrolyte layer was 9.0 mg/cm$^2$ (thickness: 45 μm) and the weight of the second solid electrolyte layer was 1.0 mg/cm$^2$ (thickness: 5 μm).

[Test 9]

An all-solid-state battery (all-solid-state lithium ion secondary battery) for Test 9 was obtained using the same materials through the same steps as for Test 2 except that the pastes were uniformly applied, so that the weight of the first solid electrolyte layer was 1.6 mg/cm$^2$ (thickness: 8 μm) and the weight of the second solid electrolyte layer was 8.4 mg/cm$^2$ (thickness: 42 μm).

[Test 10]

An all-solid-state battery formed by separately pressing the layers to be solid electrolyte layers to adjust the voidages thereof, and thereafter joining the member on the cathode side and the member on the anode side was prepared. This is referred to as a manufacturing method B. For Test 10, the cathode was prepared according to the same method as the manufacturing method A, and the anode was prepared according to the manufacturing method B.

<Preparing Layer to be First Solid Electrolyte Layer>

A layer to be a first solid electrolyte layer was formed on the layer to be a cathode, using the sulfide solid electrolyte used for preparing the layers to be a cathode and an anode. First, a layer to be a cathode active material layer was covered with stainless (SUS) foil, and pressure is applied (25° C., 15 MPa, 30 seconds) to the resultant by a pressing machine.

Next, 99.0 parts by weight of the sulfide solid electrolyte, and 1.0 part by weight of a SBR (styrene-butadiene rubber)-based binder were weighed, and blended in butyl butyrate so as to have a solid content of 60 weight %. The resultant was subjected to ultrasonic dispersing by an ultrasonic dispersive device (model: UH-50, a product manufactured by SMT Corporation) for approximately 2 minutes. Thereby, the resultant composition for forming a first solid electrolyte layer (first solid electrolyte paste) was obtained.

Then, the obtained first solid electrolyte paste was uniformly applied onto the layer to be a cathode active material layer in the same manner as when the layer to be a cathode was prepared as described above, so that the weight of the paste was 8.0 mg/cm² (thickness: 40 μm). Thereafter the resultant was air-dried, and further dried at 120° C. for approximately 3 minutes. Then, the layer to be a first solid electrolyte layer was prepared on the layer to be a cathode active material layer.

<Preparing Layer to be Second Solid Electrolyte Layer>

A layer to be a second solid electrolyte layer was prepared on the layer to be an anode, using the sulfide solid electrolyte used for preparing the layer to be a cathode and the layer to be to be an anode. First, the layer to be an anode active material layer was covered with stainless (SUS) foil, and pressure is applied (25° C., 300 MPa, 1 minute) to the resultant by a pressing machine.

Next, 99.0 parts by weight of the sulfide solid electrolyte, and 1.0 part by weight of a SBR (styrene-butadiene rubber)-based binder were weighed, and blended in butyl butyrate so as to have a solid content of 60 weight %. The resultant was subjected to ultrasonic dispersing by an ultrasonic dispersive device (model: UH-50, a product manufactured by SMT Corporation) for approximately 2 minutes. Thereby, the resultant composition for forming a second solid electrolyte layer (second solid electrolyte paste) was obtained.

Then, the obtained second solid electrolyte paste was uniformly applied onto the layer to be an anode active material layer in the same manner as when the layer to be a cathode was prepared as described above, so that the weight of the paste was 2.0 mg/cm² (thickness: 10 μm). Thereafter the resultant was air-dried, and dried at 120° C. for approximately 3 minutes. Further, pressure is applied (25° C., 24 MPa, 30 seconds) to the layer to be an anode, which was coated with the layer to be a second solid electrolyte layer, by a pressing machine. Then, the layer to be a second solid electrolyte layer having voids was obtained on the layer to be an anode active material layer.

<Preparing All-Solid-State Battery (Battery Assembly)>

A 3 cm square was stamped out from each of the layer to be a cathode, and the layer to be a first solid electrolyte layer together with the aluminum foil, and pressed at 25° C. at a press pressure of 300 MPa for 1 minute. Next, the layer to be an anode, and the layer to be a second solid electrolyte layer, each having the same shape of the stamped square, were laminated to the layer to be a cathode, and the layer to be a first solid electrolyte layer, and pressed at 25° C. at a press pressure of 24 MPa for 30 seconds. Then, the resultant electrode stack was obtained. This electrode stack was put into an outer casing which is made of an aluminum laminated film and to which cathode and anode terminals were annexed in advance, and was sealed up. Then, an all-solid-state battery (all-solid-state lithium ion secondary battery) for Test 10 which was assembled as a battery after voids were formed in the layer to be a second solid electrolyte layer was obtained.

[Test 11]

For Test 11, an all-solid-state battery such that a layer to be a solid electrolyte layer where the sublimational filler (sulfur for Test 1) was not mixed in relation to the layer to be a second solid electrolyte layer prepared for Test 1 was formed only on the anode side was prepared. Specifically, the layer to be a first solid electrolyte layer described for Test 1 was not provided. In the same manner as when the second solid electrolyte paste was prepared, the compounding ratio was: the sulfide solid electrolyte was 99 parts by weight; and the SBR (styrene-butadiene rubber)-based binder was 1.0 part by weight: and the paste was uniformly applied, so that the weight thereof was 10.0 mg/cm² (thickness: 50 μm). An all-solid-state battery (all-solid-state lithium ion secondary battery) for Test 11 was obtained using the same materials through the same steps as for Test 1 except the foregoing.

4.2. Evaluation

[Measuring Thicknesses and Voidages of Solid Electrolyte Layers]

The real thicknesses of the solid electrolyte layers were read from cross-sectional SEM images of the all-solid-state battery after the stacking. Each thickness when the filling factor was 100% was calculated from the specific gravity, the composition ratio, and the weight of each material, and the voidage was obtained from the difference between the foregoing thickness and the real thickness.

[Measuring Cell Resistance]

The all-solid-state battery for each test was restrained to have a predetermined size in the stacking direction of the electrode bodies at 1 MPa. Thereafter the battery was charged and discharged in the following conditions: 3.5 V-CCCV charge, current rate at 15 mA, current cut at 1 mA; and 3.5 V-CCCV discharge, current rate at 15 mA, current cut at 1 mA; and then was left standing for 1 hour. Next, the battery was discharged in the following conditions: CC discharge, current rate at 100 mA, cut in 10 seconds. Then, the cell resistance was measured according to the Ohm's law. The results of the foregoing are shown in the relevant boxes in Table 1 as the ratio to that of Test 11.

[Durability Test]

After the cell resistance measurement, the all-solid-state battery for each test was repeatedly charged and discharged at 100 cycles in the following conditions: 4.5 V-CCCV charge, current rate at 15 mA, current cut at 1 mA; and 2.5 V-CCCV discharge, current rate at 15 mA, current cut at 1 mA. Then, the battery was charged again in the following conditions: 4.5 V-CCCV charge, current rate at 15 mA, current cut at 1 mA. The voltage drop after 24 hours was defined as a self-discharge voltage, and was used as an index of durability of the solid electrolyte layer. The results of the foregoing are shown in the relevant boxes in Table 1 as the of ratio to that of Test 11.

4.3. Results

Table 1 shows the major conditions for and results of each test.

TABLE 1

Table 1

| | | Void | | | Thickness | | | Cell | Self-discharge |
|---|---|---|---|---|---|---|---|---|---|
| | Manufacturing method | Voidage a (vol %) of first solid electrolyte layer | Voidage b (vol %) of second solid electrolyte layer | b/a | Thickness c (μm) of first solid electrolyte layer | Thickness d (μm) of second solid electrolyte layer | d/c | resistance Ratio to result of Test 11 | voltage |
| Test 1 | A | 10 | 20 | 2.0 | 40 | 10 | 0.25 | 100 | 9 |
| Test 2 | A | 10 | 30 | 3.0 | 40 | 10 | 0.25 | 105 | 10 |
| Test 3 | A | 10 | 40 | 4.0 | 40 | 10 | 0.25 | 112 | 8 |

TABLE 1-continued

Table 1

| | Manufacturing method | Void | | | Thickness | | | Cell resistance Ratio to result of Test 11 | Self-discharge voltage result of Test 11 |
|---|---|---|---|---|---|---|---|---|---|
| | | Voidage a (vol %) of first solid electrolyte layer | Voidage b (vol %) of second solid electrolyte layer | b/a | Thickness c (μm) of first solid electrolyte layer | Thickness d (μm) of second solid electrolyte layer | d/c | | |
| Test 4 | A | 10 | 50 | 5.0 | 40 | 10 | 0.25 | 124 | 6 |
| Test 5 | A | 10 | 30 | 3.0 | 25 | 25 | 1.00 | 113 | 13 |
| Test 6 | A | 10 | 30 | 3.0 | 10 | 40 | 4.00 | 120 | 20 |
| Test 7 | A | 10 | 15 | 1.5 | 40 | 10 | 0.25 | 108 | 93 |
| Test 8 | A | 10 | 30 | 3.0 | 45 | 5 | 0.11 | 107 | 95 |
| Test 9 | A | 10 | 30 | 3.0 | 8 | 42 | 5.25 | 107 | 96 |
| Test 10 | B | 10 | 20 | 2.0 | 40 | 10 | 0.25 | 493 | 16 |
| Test 11 | A | — | 10 | — | — | 50 | — | 100 | 100 |

The comparison between Test 11 and Tests 1 to 10 proved that providing the second solid electrolyte layer having a voidage higher than the first solid electrolyte layer could improve the durability (suppress the self-discharge voltage after the cycle).

Among them, the higher the voidage was, the more stress due to a volumetric change of the anode in charge and discharge was weakened and the more it was prevented that the solid electrolyte layer on the cathode side cracked to short-circuit. More specifically, the comparison between Tests 1 to 4 and Test 7 proved that when b/a, which was the ratio of the voidage b of the second solid electrolyte to the voidage a of the first solid electrolyte layer, was at least 2, the effect of suppressing self-discharge was more remarkable. This is considered to be because a sufficiently large volume of voids in the second solid electrolyte layer improved the effect of weakening stress.

The comparison between Tests 2, 5 and 6 and Tests 8 and 9 also proved that when d/c, which was the ratio of the thickness d of the second solid electrolyte to the thickness c of the first solid electrolyte layer, was within the range of 0.25 and 4, the effect of suppressing a self-discharge voltage was remarkable. This is considered to be because the ratio d/c in this range led to harmonious thicknesses of the first solid electrolyte layer and the second solid electrolyte layer, which could suppress cracking of any of the solid electrolyte layers.

The comparative between Test 1 and Test 10 also proved the effect of reducing the cell resistance changed according to steps. As in Test 1, the cathode-the solid electrolyte layers-the anode were laminated and thereafter pressed, which made it possible to maintain the interface to hardly inhibit ionic conduction even after voids were formed, to suppress the increase in the resistance.

REFERENCE SIGNS LIST 10 all-solid-state battery
11 cathode active material layer
12 anode active material layer
13 first solid electrolyte layer
14 second solid electrolyte layer
15 cathode current collector layer
16 anode current collector layer

What is claimed is:
1. A method of manufacturing an all-solid-state battery, the method comprising:
 obtaining a stack having an anode active material layer, a cathode active material layer, a first solid electrolyte layer, and a second solid electrolyte layer, the first solid electrolyte layer and the second solid electrolyte layer being disposed between the anode active material layer and the cathode active material layer, the second solid electrolyte layer containing a sublimational filler;
 densifying the stack; and
 subliming the sublimational filler from the second solid electrolyte layer.

* * * * *